United States Patent [19]
Naper

[11] Patent Number: 5,491,565
[45] Date of Patent: Feb. 13, 1996

[54] SYSTEM AND METHOD FOR VARYING THE TRANSMISSION RATE OF FACSIMILE DATA IN A TELECOMMUNICATION SYSTEM

[75] Inventor: Hans P. Naper, Montreal, Canada

[73] Assignee: Telefonaktiebolaget LM Ericsson, Stockholm, Sweden

[21] Appl. No.: 162,539

[22] Filed: Dec. 3, 1993

[51] Int. Cl.$^6$ ............................... H04N 1/32; H04N 1/00; H04B 1/02

[52] U.S. Cl. ..................... 358/468; 358/434; 358/435; 358/436; 455/91

[58] Field of Search ...................... 358/468, 434, 358/435, 436, 438, 439, 445, 469, 442, 444, 404, 406; 455/91; 379/100

[56] References Cited

U.S. PATENT DOCUMENTS

| | | |
|---|---|---|
| 4,933,770 | 6/1990 | DeSpain . |
| 4,975,783 | 12/1990 | Takaoka . |
| 5,016,115 | 5/1991 | Calkins . |
| 5,041,917 | 8/1991 | Koshiishi ............................. 358/436 |
| 5,055,945 | 10/1991 | Oguma et al. . |
| 5,127,051 | 6/1992 | Chan et al. . |
| 5,289,582 | 3/1994 | Hirata ..................................... 358/400 |

OTHER PUBLICATIONS

Vol. 7, No. 158 (E–186) Apr. 18, 1983 Japan.
Vol. 16, No. 530 (E–1287) Jul. 16, 1992 Japan.
Meeting Summary of TIA TR45.3 Committee—TMDA Cellular Systems (Working Group 2).

*Primary Examiner*—Edward L. Coles, Sr.
*Assistant Examiner*—Allan A. Esposo
*Attorney, Agent, or Firm*—Ross, Clapp, Korn & Montgomery

[57] ABSTRACT

A source facsimile apparatus includes a modem having a variable transmission rate and is connected by a radio link to a destination facsimile apparatus which is located in a mobile subscriber station within a radio network. Facsimile data is transmitted at a selected data transmission rate from the source facsimile apparatus to a modem within an interworking function located in the radio network. A buffer memory stores the facsimile data received by the modem of the interworking function. The facsimile data is then transmitted from the buffer memory via the radio link to the destination facsimile apparatus within the mobile station. If the radio link does not allow facsimile data to be sent to the mobile station at about the same rate it is being received by the modem of the interworking function, the latter is changed to bring the two into closer conformity.

9 Claims, 3 Drawing Sheets

SYSTEM AND METHOD FOR VARYING THE TRANSMISSION RATE OF FACSIMILE DATA IN A TELECOMMUNICATION SYSTEM

BACKGROUND OF THE INVENTION

1. Field of the Invention

The invention relates to the implementation of facsimile communication within a radio telecommunication system and, more particularly, to a system for varying the transmission rate for facsimile data within a cellular radio system.

2. History of the Related Art

Cellular radio communications is, perhaps, the fastest growing field in the world-wide telecommunications industry. The convenience of subscriber mobility and the ability to place and receive telephone calls regardless of where the subscriber is located has introduced a new era. The convenience of telecommunications without the restrictions of a physical telephone cable limiting the mobility of the subscriber station is a great advantage.

As cellular radio communications networks have grown in recent years, facsimile communication has become common not only between facsimile apparatuses at offices connected via wired transmission lines but also between a facsimile apparatus at a fixed station such as an office and a facsimile apparatus at a mobile station such as within an automobile, or even, between two mobile stations coupled via a radio link. In the most commonly used facsimile communication procedure specified by the CCITT Group-3 standard, a facsimile apparatus at a source terminal transmits page data signals representing a coded image data for one page of a document to be transmitted. When this has been completed the facsimile apparatus sends an MPS signal indicative of the end of the transmission of that page. In the destination facsimile terminal, an apparatus receives the page data signals sequentially and decodes the transmitted image from that signal as received. During the process of decoding, the occurrence of any transmission errors is monitored and in the event the transmission errors exceed a certain threshold value, the system discontinues transmission and instructs the source terminal to resend the document.

In the transmission of facsimile data via radio links, the system is naturally more vulnerable to noise and thus more susceptible to transmission errors during the transmission of a document. When this occurs, conventional destination facsimile apparatus interrupts the transmission and requests the operator of the source machine to resend the document. This often results in the operator having to resend the document multiple times in order to complete the transmission of the data from source facsimile machine to a destination facsimile machine located at a mobile station within a cellular radio network. One means of addressing this problem is to disable the error detection mechanism at the destination facsimile apparatus so that the entire facsimile transmission is received regardless of the quality of that transmission. However, this approach is not acceptable since there is a substantial chance that the entire received document would be unintelligible without the operator at the source facsimile machine being aware of that fact.

Another solution to this problem is that proposed in U.S. Pat. No. 5,041,917 to Koshiishi in which a mobile facsimile receiving apparatus includes not only means to detect the number of errors which have occurred during transmission but also to allow a variable number of errors at various different threshold values as a function of the type of transmission medium over which the data is sent. In the event the error rate exceeds the threshold assigned to that particular transmission medium, the originating facsimile operator is notified to resend the document. This technique also has a disadvantage in that repeated resendings of the document are required regardless of whether the particular transmission link might be able to handle the data more accurately if only the transmission rate was reduced.

In the CCITT Group-3 facsimile service currently being standardized for the American digital cellular system, the facsimile standard describes a real time exchange of facsimile image data between a source facsimile machine connected to the public switch telephone network (PSTN) and a cellular mobile station (MS). The CCITT T. 30 facsimile protocol is terminated in a cellular interworking function (IWF) and is therefore not ever seen by the mobile station. The facsimile protocol proposed for use on the RF interface link between the MS and the IWF is based upon the EIA/TIA-592 asynchronous facsimile DCE control standard promulgated by Electronic Industries Association (EIA). Under this protocol, when a mobile station receives facsimile pages over an RF interface, the data throughput capability of this RF link may become deteriorated due to various transmission related parameters such as channel interference and facsimile image data is buffered in the IWF or elsewhere in the cellular network. Such buffered data must be delivered to the MS before the buffers overflow and before commencement of the reception of the next page transmitted by the source facsimile machine. Under this protocol if all the buffered facsimile data cannot be delivered to the mobile station in time, the block of data remaining in the buffer must be discarded. The facsimile call may then either be cleared entirely or continued with a partially blank facsimile page at the destination facsimile machine.

One potential solution to the buffer overflow problem associated with the buffer memory in the interworking function of the cellular network is that of providing large buffers, i.e., buffer memories big enough to hold at least one full facsimile page. However, the timing problem is not so easily solved. Real time requirements for a cellular facsimile call limits the time allowed between the complete transmission of one facsimile page and the initiation of the transmission of the next facsimile page. The IWF must completely deliver a facsimile page to the mobile station before the transmitting fax machine can begin transmission of the next page. One proposed technique for addressing the timing problem is to use facsimile machines which include error correction mode (ECM), as described in CCITT recommendations T.4 and T.30. Such error correction mode facsimile machines are illustrated in U.S. Pat. No. 4,975,783 to Takaoka. However, error correction mode cannot be mandated for each facsimile call made within a cellular mobile network and, moreover, many existing facsimile machines do not support ECM. Renegotiation of the data rate from the source facsimile machine would appear to be a logical solution, however, how to accomplish this end remains a problem.

While the preferred embodiment of the invention is employed in a cellular radio system, it should be understood that the invention can be used in other radio systems such as personal communications systems (PCS), land mobile radio, satellite systems, etc.

The system of the present invention contemplates a system for implementing the transmission of fax data within a radio communication network in accordance with the recommended protocols which reduces the need for repeated retransmissions of the data and still enables the communication of fax data within a radio network in accordance with established specifications.

SUMMARY OF THE INVENTION

In one aspect, the present invention monitors information about cellular RF transmission channel quality and based upon that quality changes the rate in which facsimile data is being transmitted from the PSTN to the IWF within the base station. In the event that transmission conditions are sufficiently poor, the data transmission rate is adjusted to avoid overflow of the buffers and, in the event the buffers are not empty when the received data must be acknowledged a signal is induced to comply with the facsimile machine protocol and prepare for the reception of the next facsimile page. Receipt of the subsequent facsimile data at a lower bit rate by the IWF may reduce the contents of the buffer memory and avoid the associated buffering problems.

In another aspect, the invention includes the communication of facsimile data from a source facsimile apparatus including a modem having a variable transmission rate and connected by a radio network to a destination facsimile apparatus located in a mobile subscriber station which is coupled to a base station within the radio network by a radio link. Facsimile data is transmitted at a selected data transmission rate from the source facsimile apparatus to a modem within an interworking function located in the radio network. A buffer memory stores the facsimile data received by the modem of the interworking function The facsimile data is then transmitted from the buffer memory via the radio link to the destination facsimile apparatus within the mobile station. The quantity of data stored in the buffer memory is monitored while facsimile data is received by the modem of the interworking function and transmitted from the buffer memory via the radio link. The selected data transmission rate is changed at the source facsimile apparatus in response to a difference between the selected data transmission rate and the rate at which data is transmitted to the destination facsimile apparatus within the mobile station. In one embodiment of the invention the selected data transmission rate is changed in response to the quantity of data remaining in the buffer memory at the end of the transmission of a complete page of facsimile data by the source facsimile apparatus.

In a further aspect, the invention includes an interworking function within a radio network for receiving facsimile data from a source facsimile apparatus including a modem having a variable transmission rate and forwarding the facsimile data via a radio interface to a destination facsimile apparatus in a mobile station located within the radio network. A modem receives facsimile data at a first data rate and exchanges control signals with the modem of the source facsimile apparatus. A buffer memory stores data received by the modem from the source facsimile apparatus. Facsimile data stored in the buffer memory is sent to the destination facsimile apparatus in the mobile station via the radio interface at a second data rate determined by the then existent radio transmission conditions between the mobile station and the radio base station with which it is connected. A difference between the first and second data rates is determined and control signals are exchanged between the modem within the interworking function and the modem within the source facsimile apparatus to change the first data rate and thereby decrease the difference between it and the second data rate.

BRIEF DESCRIPTION OF THE DRAWINGS

For a more complete understanding of the present invention and for further objects and advantages thereof, reference may now be had to the following description taken in conjunction with the accompanying drawings, in which.

DETAILED DESCRIPTION

Figure 1:
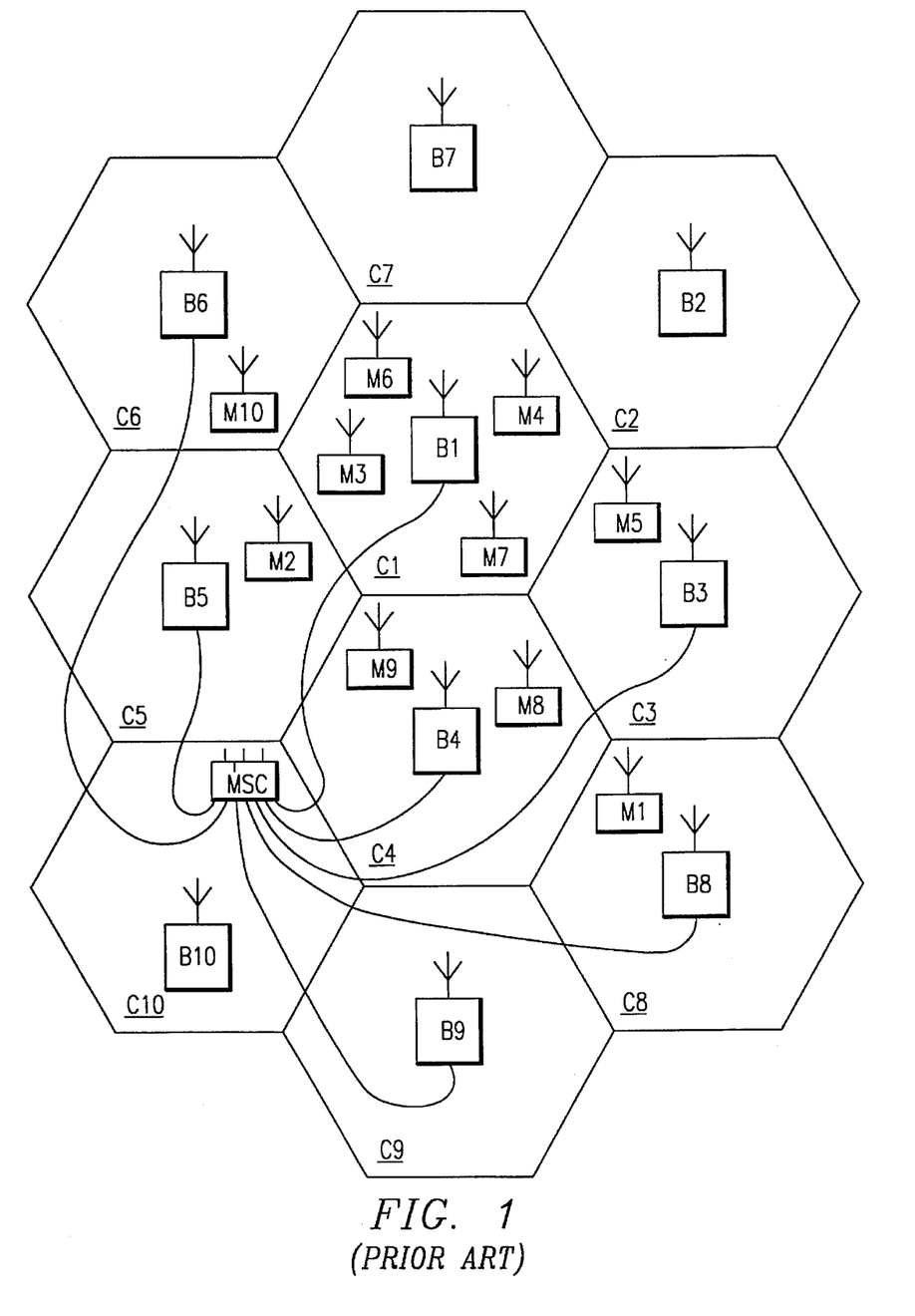
FIG. 1 is a block diagram illustrating components of a cellular radio communication system associated with the present invention.

Referring first to FIG. 1, there is illustrated a conventional cellular radio communication system of the type to which the present invention may generally pertain. In FIG. 1, an arbitrary geographic area may be divided into a plurality of continuous radio coverage areas, or cells C1–C10. Upon the system of FIG. 1 is illustratively shown to only include 10 cells, it should be clearly understood that in practice, the number of cells would be much larger.

Associated with and located within each of the cells C1–C10, is a base station designated as a corresponding one of a plurality of base stations B1–B10. Each of the base stations B1–B10 includes a transmitter, receiver, and a base station controller as are well known in the art. In FIG. 1, the base stations B1–B10 are selected to be located at the center of each of the cells C1–C10, respectively, and are equipped with omni-directional antennas. However, in other configurations of a cellular radio system, the base stations B1–B10 may be located near the periphery, or otherwise away from the centers of the cells C1–C10 and may illuminate the cells C1–C10 with radio signals either omni-directionally or directionally. Therefore, the representation of the cellular radio system of FIG. 1 is for purposes of illustration only and is not intended as a limitation on the possible implementations of a mobile radio communications system within which a facsimile communication of the system of the present invention may be implemented.

Continuing reference to FIG. 1, a plurality of mobile stations M1–M10 will be found within the cells C1–C10. Again, only ten mobile stations are shown in FIG. 1, but it should be understood that the actual number of mobile stations will be much larger and, in practice, will invariably greatly exceed the number of base stations. Moreover, mobile stations M1–M10 may be found in some of the cells C1–C10. The presence or absence of the mobile stations M1–M10 in any particular one of the cells C1–C10 should be understood to depend, in practice on the individual desires of the mobile stations M1–M10 and may roam from one location in the cells to another, or from one cell to an adjacent cell or neighboring cell, and even from one cellular radio system served by an MSC to another such system all the while receiving and placing calls both within the cellular system as well as the public switch telecommunication network (PSTN).

Each of the mobile stations M1–M10 is capable of initiating or receiving a telephone call through one or more of the base stations B1–B10 and a mobile switching center MSC. Such calls may be either for voice communications or for data communications such as facsimile image communication as in the case of the system of the present invention. The mobile switching center MSC is connected by communication links, e.g., cables, to each of the illustrative base stations B1–B10 and the fixed public switch telephone network PSTN (not shown) or a similar fixed network which may be include an integrated services digital network (ISDN) facility. The relevant connections between the mobile switching center MSC and the base stations B1–B10, or between the mobile switching center MSC and the PSTN or ISDN, are not completely shown in FIG. 1 but are well known to those of ordinary skill in the art. Similarly, it is also known to include more than one mobile switching center in the cellular radio system and to connect each additional mobile switching center to a different group of base stations and to other mobile switching centers via cables or radio links.

Each of the cells C1–C10 is allocated a plurality of voice or speech channels and at least one access or control channel, such as a forward control channel (FOCC). The control channel is used to control or supervise the operation of the mobile station by means of information transmitted and received from those units, referred to as messages. Control and administration messages within a cellular radio system are sent in accordance with industry established air interface standards, such as EIA/TIA 553, the standard for analog cellular operations, and/or IS–54B, the standard for digital cellular operations. While these standards govern North American operations, similar standards govern other geographic areas throughout the world. The information exchanged between base stations and mobile stations via messages, may include incoming call signals, outgoing call signals, paging signals, paging response signals, location registration signals, voice channel assignments, maintenance instructions and handoff instructions as the mobile station travels out of the radio coverage of one cell and into the radio coverage of another cell, as well as other additional items of information such as calling party numbers, time information, and the like. The control or voice channels may operate in either analog or digital mode or a combination thereof based upon industry standards.

Figure 2:
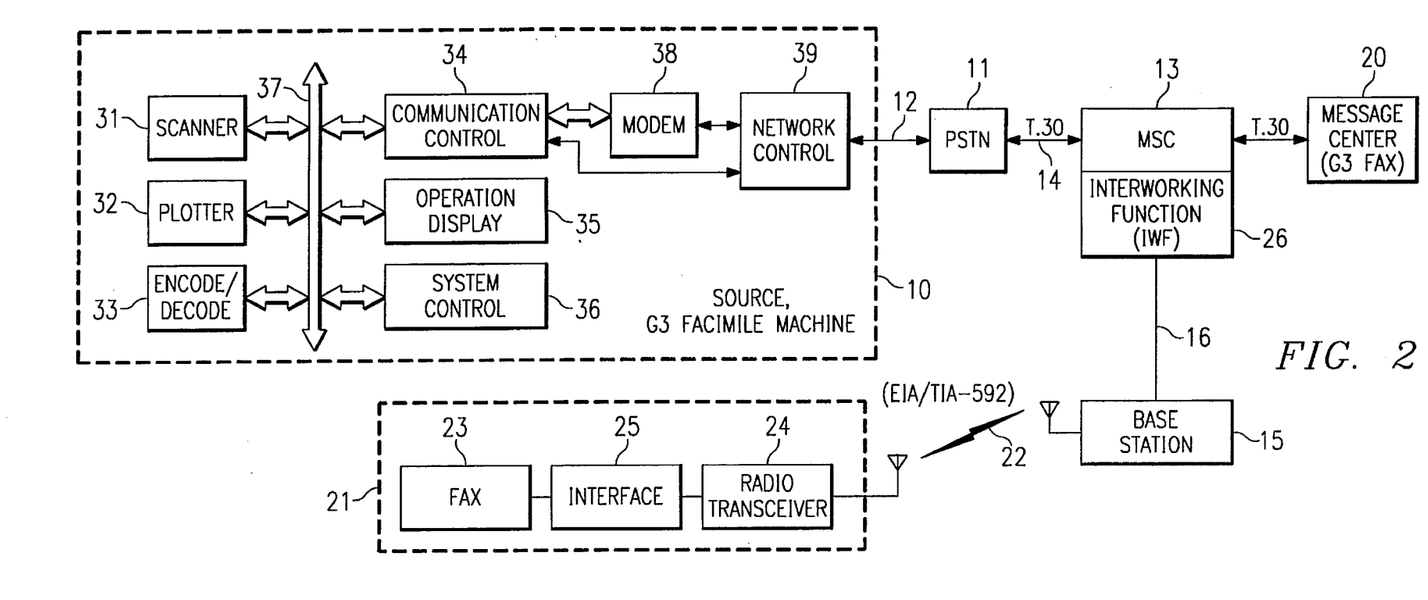
FIG. 2 is a block diagram depicting a facsimile transmission system implemented within the cellular radio communication system including features of the present invention.

Referring next to FIG. 2, there is shown a facsimile communication system forming part of a cellular radio communication system in accordance with certain aspects of the teachings of the present invention. A source facsimile machine 10 is connected to the public switch telecommunication network (PSTN) 11, or alternatively an integrated services digital network (ISDN), by means of a land line transmission network 12. The PSTN 11 is in turn connected to an MSC 13 of a cellular communication network also by means of a land line 14. The MSC is, in turn connected to a base station of the cellular radio system by means of a land line link 16. Communication on land line links 14, may be in accordance with CCITT T.30 protocol. The base station 15 is, in turn, connected to one or more mobile stations 21 by means of a radio interface 22 over which information is sent and received from the cellular radio system infrastructure to mobile stations operating within the cells of the system.

The source facsimile machine 10 illustratively is of the type which may conventionally be used in an office and may comprise a scanner 31, a plotter 32 and an encoding and decoding unit 33. In addition the machine 10 may include a communication controller 34, an operation display 35 and a system control 36 all of which are coupled to one another by means of a system bus 37. A fax modem 38 is connected to send and receive facsimile data to the PSTN 11 by means of a network control 39.

In operation, the source facsimile machine 10 functions by means of the scanner 31 reading a document image and outputting image data with a predetermined resolution in response to scanning and reading of the document. The encoding and decoding unit 33 encodes the image data which is to be transmitted to a facsimile apparatus at a destination terminal when the facsimile apparatus 10 is used as a source terminal sending a facsimile transmission. When the facsimile apparatus 10 is used for receiving a facsimile transmission, the encoding and decoding unit 33 performs a decoding of the transmitted fax data.

The modem 38 modulates a carrier signal with the image data to be transmitted to form a modulated carrier when transmitting an image data and demodulates the modulated carrier when receiving the image data to recover the transmitted image data from the signal. Further, the modem 38 transmits various procedure signals for the control of transmissions to and from the machine 10. The modem 38 is connected to the network controller 39 which is physically connected to the PSTN 11 by means of the land line 12. The network controller 39 performs a predetermined automatic calling and answering procedure to the PSTN with the PSTN enabling the source facsimile machine 10 to be connected to a destination facsimile machine by means of the PSTN 11.

The PSTN 11 couples signals to a cellular radio communication system through a mobile switching center, MSC 13, which is connected to a plurality of base stations 15 as illustrated above in conjunction with FIG. 1. The base stations 15 may be coupled to a mobile facsimile system 21 by means of a radio interface 22. The mobile station 21 includes a destination facsimile machine 23 coupled to a radio transceiver 24 by means of an interface 25 which provides signal level adjustments and/or impedance matching between the radio transceiver 24 and the fax 23. The fax 23 may be similar in construction to the source facsimile machine 10. The communications controller 34 of the source fax machine 10 controls the communication, for example, in the error correction mode (ECM) of the Group-3 standard recommended by CCITT and makes a predetermined facsimile communication. The operation display unit 35 of the source facsimile machine 10 has an operation control portion for setting various operations of the facsimile apparatus 10 and a display portion for displaying various available modes of the facsimile apparatus 10 for guidance of the operating personnel during use of the system. The destination facsimile apparatus 23 contains similar controls as the system controller 36 and comprises, for example, a micro computer which controls the scanner 31, the plotter 32, the encoding unit 33, and the communication controller 34 as well as the operation/display unit 35 so as to carry out a predetermined operation of the facsimile apparatus 10. In accordance to the established CCITT Group-3 fax protocol, the source facsimile machine enters into bit rate negotiation with a destination facsimile machine prior to the transmission of the first facsimile page and, optionally, between transmission of pages. Such procedures establish the data transmission rate to be used by the source facsimile machine 10 of the transmission of facsimile data into the PSTN.

Alternatively, the mobile fax apparatus 23 may comprise a personal computer (PC) loaded with suitable facsimile application software and connected to the radio transceiver 24 through the asynchronous interface 25. Similarly, by way of alternative embodiment, the mobile facsimile system 21 may consist of an integrated fax and radio transceiver unit.

As pointed out above, Group-3 facsimile service is currently being standardized for the American digital cellular system, IS-54B, and this facsimile standard describes the real time exchange of facsimile image data between a source facsimile machine 10 connected to the PSTN 11 and a cellular mobile station 21 moving within a cellular radio communication system. The CCITT T.30 facsimile protocol from the PSTN is terminated in an interworking function (IWF) 26 included as part of the MSC 13. Alternatively, the IWF 26 can be located in the radio base station 21. The IWF 26 comprises a pool of modems, buffers, and associated control circuitry for determining incoming and outgoing data rates and adjusting the differences therebetween. The facsimile protocol to be used on the radio frequency interface link 22 between the mobile station 21 and the base station 15 is based upon the EIA/TIA-592, "asynchronous facsimile DCE control standard". In such standard, when a mobile station receives facsimile pages over an RF interface, and the data throughput on the RF interface becomes deteriorated due to radio interference which may occur on the link, facsimile image data is buffered in the interworking function 26. While such buffering facilitates the transmission of fax data on the RF link, the buffered data must be delivered to the mobile station 21 before the buffers overflow and before the reception of the next page from the source facsimile machine via the PSTN 11. If all of the buffered facsimile data cannot be delivered to the mobile station 21 prior to reception of the next page or before the buffers overflow, data must be discarded from the buffer to enable reception of the next page data. In such case, the call must either be cleared or continued with a partially blank facsimile page corresponding to the data which was discarded and not transmitted on the RF link to the destination fax machine.

The message center 20 represents a fax message center containing fax mailboxes capable of receiving and storing fax transmissions from the PSTN intended for subscribers who were not available at the time. Such stored fax transmissions can be later forwarded to the intended recipients in accordance with the principles of the present invention just as if they were being sent originally from a source facsimile apparatus. That is, the fax mailbox itself becomes a source facsimile apparatus.

Real time requirements for cellular facsimile calls in accordance with the proposed standards, limits the time allowed between the complete transmission of one facsimile page and the initiation of transmission of the next facsimile page. Thus, the interworking function, IWF 26, in the MSC 13 must completely deliver a facsimile page to the mobile station via the air interface link 22 before the source facsimile machine, functioning in accordance with Group-3 standards, can start transmission of the next page. While error correction mode (ECM), described in CCITT recommendation T.4 and T.30 may assist in improving the quality of the resulting fax transmission, such ECM cannot be mandated on a fax call nor do all existing facsimile machines have such capability. The system of the present invention allows control over the fax data transmission rate by the source facsimile machine 10 and improves the quality of data received by the destination fax machine 23 in the mobile station 21.

As mentioned above, the facsimile modems 38 within source facsimile machines 10 operating in accordance with the Group-3 CCITT standards, include the capability of negotiating the bit rate used to transfer facsimile image data over telephone lines. The negotiation procedure specified by CCITT uses measurements of the quality of the telephone lines and if the telephone line is of poor quality, the resulting bit rate with which facsimile data is to be transmitted by the source facsimile machine is adjusted down in order to meet the error rate requirements of the machine. In conventional wire line communication, the telephone lines are generally good which produces relatively high bit rates during the negotiation process.

Bit rate negotiation with a Group-3 facsimile machine takes place before the transmission of the first facsimile page and, optionally, between the transmission of each of the successive pages. For bit rate negotiation to occur between the transmission of successive pages of data, the destination facsimile modem can request retraining of the transmitting modem by sending a "retrained negative" or "retrained positive" message in accordance with CCITT recommendation T.30. The operator of the system can also sometimes set an upper bound on the negotiated bit rate in order to avoid higher bit rates than the equipment can possibly handle.

The system of the present invention employs information gained from the reception of the previous facsimile page to decide upon an upper limit on the new bit rate to be negotiated with the source facsimile machine in the event the base station was unable to transmit the majority of the data from the buffer of the interworking function 26 to the mobile station 21 before reception of data for the next successive page. Additionally, if much data was required to be buffered in the interworking function during reception of the previous facsimile page, it is used as an indication that the bit rate must be decreased. If the bit rate is to be decreased for the next page of data to be sent by the source facsimile machine, the destination facsimile modem in the interworking function 26 issues a retrain negative or retrain positive message to the source facsimile machine in accordance with Group-3 fax protocols. A retrain negative message is used if facsimile data was discarded for the previous page in order to meet the requirements of interpage timing. A train positive message is used if the previous page was received without errors but even though buffering took place.

Upon reception of a retrain negative or a retrain positive message, the source facsimile machine 10, in accordance with the Group-3 fax protocol, initiates a bit rate negotiation procedure also known as modem retraining. The facsimile machine 10 will propose a new bit rate to the interworking function modems 26 and it is up to those modems to accept the proposed bit rate or to ask for another modem retraining sequence. In the case that the bit rate proposed by the source facsimile machine 10 is not low enough, the receiving modems in the interworking function 26 respond to the modem training with a T.30 failure to train message, thereby forcing the transmitting source facsimile machine 10 to lower the bit rate again and repeat the modem training. The interworking function modems 26 can respond to the modem training with a failure to train message until the bit rate is low enough to match the conditions currently existing in the RF interface with respect to the transmission of fax data across that RF link. The bit rate negotiation requires no special action by the mobile station 21 since the negotiation only affects the bit rate between the interworking function modems 26 and the Group-3 source facsimile machine 10 and since the CCITT T.30 facsimile protocol is terminated in the interworking function 26. The modem retraining requested by the interworking function 26 will also in itself take some time so during this time the data buffered within the interworking function buffers may be successfully transferred to the mobile station 21. Although the technique of the present invention is focused primarily on the facsimile service within the American digital cellular system, IS-54, it is also applicable to other digital transmission standards such as the European GSM standard or the Japanese PDC standard.

Figure 3:
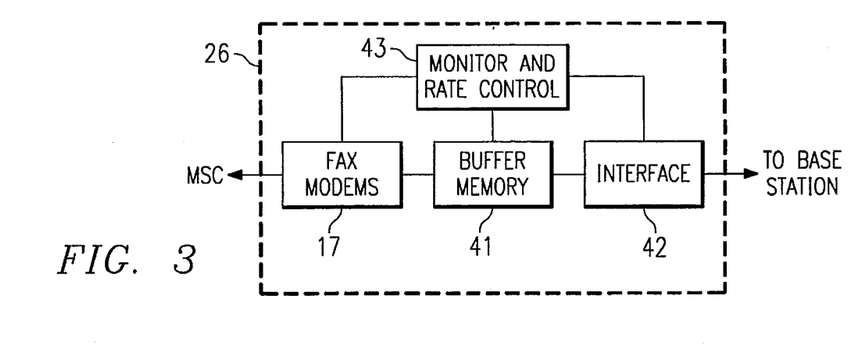
FIG. 3 is a block diagram of a cellular radio base station including a system constructed in accordance with the teachings of the present invention.

Referring next to FIG. 3, there is illustrated an interworking function IWF 26 including components constructed in accordance with the present invention. The fax modems 17 of the IWF 26 are coupled within the MSC to receive the fax data from the PSTN. The received data is first input to a buffer memory 41 and thereafter via interface 42 to the radio base station equipment. A monitor and rate control circuit 43 is coupled to the buffer memory 41 as well as the fax modem 17 and the interface 42. When facsimile data is received by the modems 17 over the link 14 from the PSTN, these data are input to the buffer memory 41, and under control of the monitor and rate control circuitry 43 transmitted to the mobile unit 21 via the fax modem 17. When successive pages of fax data must be received before each page of fax data previously received is emptied from the buffer 42, the monitor and rate control circuit 43 sends an indication back via the link 14 to the source facsimile machine that it desires to renegotiate the data transmission rate being used by the source fax machine. Such an indication is a retrain negative message configured in accordance with CCITT recommendation T.30 of the Group-3 fax machine protocol. The degree of fill remaining in the buffer memory upon the receipt of the next succeeding page data from the source fax machine is an indication of the rate at which the fax modem 17 is able to transmit the facsimile data to the mobile station 21. In the case of adverse radio transmission conditions limiting the rate at which data can be transmitted via the RF link 22, this requires that a decision be made with respect to the rate at which page data should be received from the source fax machine. This RF transmission data rate is then converted into a rate in which data may be received from the source fax machine and a retrain message results in an offering of a lower bit rate by the source fax machine. When the offered bit rate from the source fax machine equals to or is less than the rate at which the interworking function is able to dispose of the data by transmitting it to the mobile station, it accepts the new lower bit rate from the source fax machine and again receives pages sent by the fax machine. This system allows a considerably enhanced transmission data rate to the mobile station and a decreased need to retransmit pages due to improper reception at the mobile fax machine.

Figure 4:
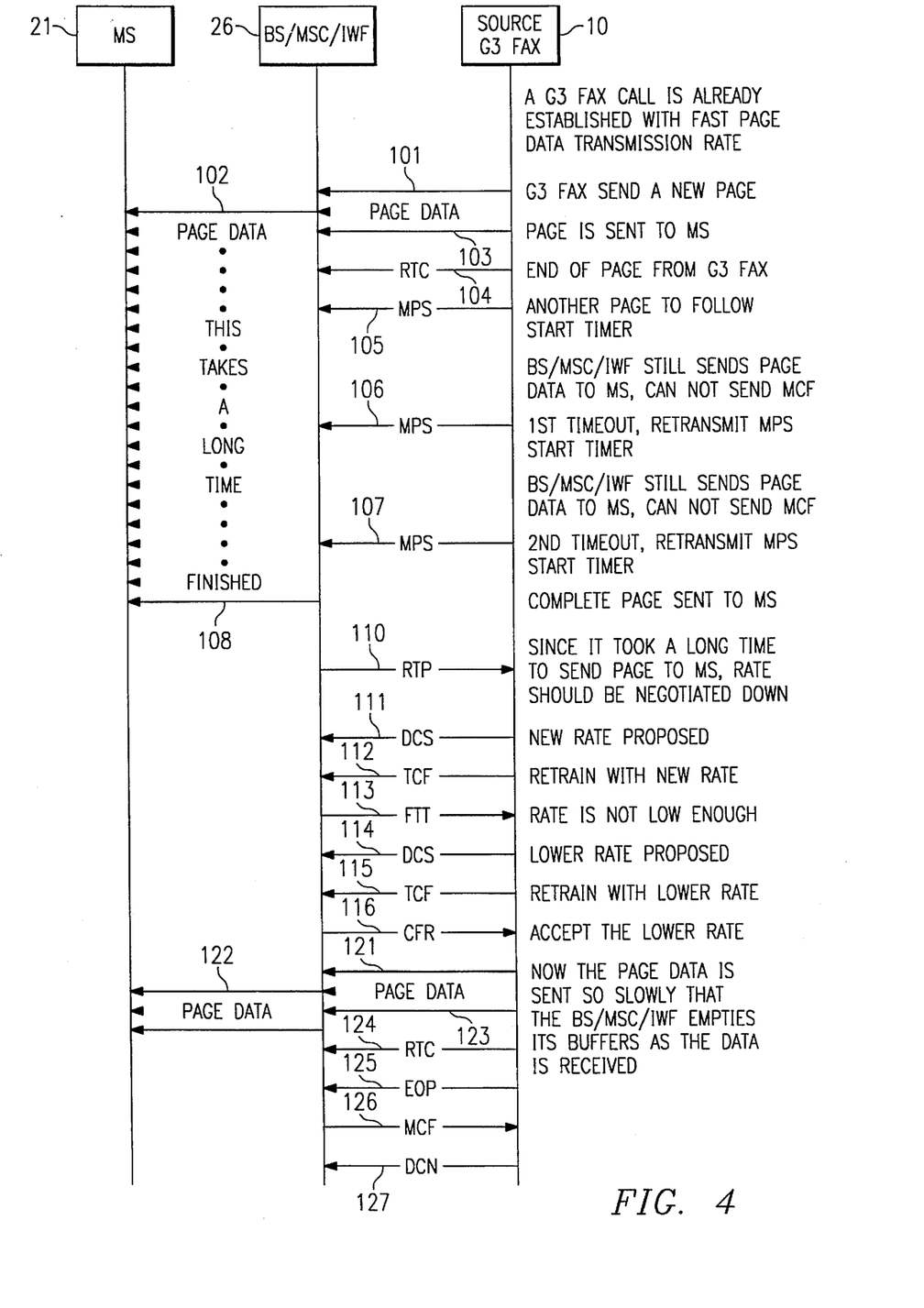
FIG. 4 is a sequence diagram depicting fax rate control procedures in accordance with the present invention.

Referring next to FIG. 4, there is shown a sequence diagram in which time flows from top to bottom (although not to scale) and illustrating an illustrative implementation of fax data rate control in accordance with the present invention. In FIG. 4, the simplified sequence diagram depicts the sequence of events leading up to and the execution of a forced retraining of the facsimile data transmission rate from the source fax machine 10 by means of the interworking function 26 controlling the transmission of facsimile data to the destination fax machine located in the mobile station 21. First, a Group-3 facsimile call is assumed to have been established with a fast page data transmission rate by the source facsimile machine 10. At 101 page data representing a new page being transmitted by the source fax machine 10 is transmitted in accordance with Group-3 protocols. As discussed above, these data are received into a buffer memory contained within the IWF 26 and from the buffer memory, facsimile data is begun to be transmitted at 102 from the base station to the mobile station and the destination fax machine located within the mobile station 21. At 103, the source fax machine 10 completes the transmission of data corresponding to the page begun at 101 and at 104 transmits a return to control (RTC) signal indicating the end of the page data just transmitted by the source fax machine 10. Next, at 105, the source fax machine 10 transmits a multi-page signal (MPS) indicating another page of facsimile data is to follow from the source fax machine 10 and a timer is started in the source fax machine 10. Since the BS/MSC/IWF 26 is still in the process of sending page data from its buffer memory to the mobile station 21, the modem within the IWF 26 cannot return a message confirmation (MCF) signal to the source fax machine 10. Upon the expiration of the first time out period within the source fax machine 10, it retransmits at 106 the multi-page signal and restarts the timer. Since the BS/MSC/IWF 26 is still in the process of transmitting page data to the mobile station 21 from its buffer memories, it still cannot return a MCF signal to the source fax machine 10 within the expiration of the second time out within the source fax machine 10. In response to this second time out, the source fax machine 10 retransmits its multi-page signal at 107 and starts its timer again.

At 108, the page data from the buffer memory within the IWF 26 corresponding to the first page transmitted by the source machine 10, is finally finished being transmitted to the mobile station 21. The circuitry within the IWF 26 monitoring the rate at which the first page data was cleared from the buffer memory and the receipt of successive MPS signals from the source fax machine, determines that the data rate with which facsimile data is being transmitted to the fax modems within the IWF 26 is too high and the data rate should be negotiated down. Accordingly, the IWF 26 transmits a retrain positive (RTP) signal 110 to the source fax machine 10 resulting in the proposal of a new fax data rate by means of a digital command signal (DCS 111). Thereafter, the source facsimile machine 10 transmits a training check (TCF) signal 112 to retrain the IWF modem 26 with the new rate. Because the new rate proposed in the DCS signal 111 was still greater than the data rate determined by the IWF 26 to be appropriate for the existent RF conditions between the base station and the mobile station 21, it returns a failure to train (FTT) signal indicating the rate at 113 indicating that the rate is not low enough.

In response to the receipt of the failure to train signal 113, the source fax machine 10 sends a command signal DCS proposing a lower rate at 114 followed by a training check (TCF) signal at 115 to attempt to retrain the fax modems in the IWF 26 at the lower rate. Since the most recently proposed rate was equal to or less than the rate deemed acceptable by the control circuitry within the IWF 26 or the difference between the proposed rate and the rate determined to be preferred is less than a selected value, its fax modems return a confirmation to receive signal 116 (CFR) to accept the lower data rate. At 121 the source fax machine 10 begins the transmission of the subsequent page data to the buffer memory of the IWF 26 which is thereafter transmitted by the base station to the mobile station and the destination fax machine within the mobile station 21 at 122. The data rate of the fax transmission from the source fax machine 10 is sufficiently slow that the BS/MSC/IWF 26 empties its buffers at the same rate as the data is received from the source fax machine 10. Thereafter completion of the transmission of the page data at 123 is followed by a return to control signal 124 and an end of procedures (EOP) signal 125. Next, the modems within the IWF 26 return a message confirmation (MCF) signal 126 followed by a disconnect (DCN) signal 127 generated by the source facsimile apparatus indicating that all the facsimile data has been transmitted from the fax machine 10 completing the transaction. It should be understood that FIG. 4 does not show certain radio interface signals on the link 22 which are necessary in order to fulfill the air interface protocol requirements.

While not specifically illustrated in FIG. 4, it should be noted that the fax rate negotiation process can be initiated (by the transmission of an RTP signal) prior to the emptying of the buffer memory of page data. This procedure notifies the source facsimile machine of receipt of the previously sent page data prior to the occurrence of a sufficient number of timeouts to cause the source machine to disconnect.

In summary, the system of the present invention includes the monitoring of the rate at which fax data can be accurately transmitted via an interface to a mobile fax machine and retraining the modem in a source fax machine to either lower or raise the rate depending upon the predominating radio interface transmission conditions.

It is believed that the operation and construction of the present invention will be apparent from the foregoing description and, while the method and apparatus shown and described has been characterized as being preferred, obvious changes and modifications may be made therein without departing from the spirit and scope of the invention as defined in the following claims.

What is claimed is:

1. A method of communicating facsimile data from a source facsimile apparatus including a modem having a variable transmission rate and connected by a radio network to a destination facsimile apparatus located in a mobile station which is coupled to a base station within said radio network by a radio link, said method comprising the steps of:

receiving facsimile data transmitted at a selected data transmission rate from said source facsimile apparatus at an interworking function located in said radio network, said interworking function including a modem for receiving said facsimile data, and a buffer memory for storing said facsimile data;

storing said facsimile data within said buffer memory;

transmitting said facsimile data from said buffer memory via said radio link to said destination facsimile apparatus within said mobile station;

monitoring the quantity of said facsimile data stored in said buffer memory while said facsimile data is received by said interworking function modem and transmitted from said buffer memory via said radio link;

changing said selected data transmission rate at said source facsimile apparatus in response to a difference between said selected data transmission rate and an actual transmission rate which radio transmission conditions on said radio link permit, as data is transmitted via said radio link to said destination facsimile apparatus within said mobile station;

determining within said interworking function, a preferred selected data transmission rate from said source facsimile apparatus, said preferred selected data transmission rate being approximately equal to the actual transmission rate at which radio transmission conditions on said radio link permit data to be transmitted to said mobile station via said radio link, said determining step further comprising:

sending a first signal from said source facsimile apparatus to said interworking function after each page of facsimile data sent from said source facsimile apparatus;

sending a second signal from said source facsimile apparatus to said interworking function when there exists a subsequent page of facsimile data to be sent from said source facsimile apparatus;

sending a third signal from said interworking function to said source facsimile apparatus in response to said second signal when said buffer is empty of said facsimile data representing the page previously transmitted;

repetitively initiating a timer in said source facsimile apparatus, for measuring a period of time within which said source facsimile apparatus must receive said third signal before transmitting said subsequent page of facsimile data;

repetitively sending, while facsimile data remains in said buffer memory, said second signal from said source. facsimile apparatus to said interworking function each time said timer expires; and determining said preferred selected data transmission rate for said source facsimile apparatus in response to a total number of second signals received by said interworking function modem prior to the production of said third signal thereby.

2. A method of communicating facsimile data from a source facsimile apparatus including a modem having a variable transmission rate and connected by a radio network to a destination facsimile apparatus as set forth in claim 1 in which said step of determining a preferred selected data transmission rate includes the steps of:

transmitting a retrain signal from said interworking function modem to said source facsimile apparatus;

receiving a signal proposing a new selected data transmission rate from said source facsimile apparatus in response to said retrain signal;

comparing the proposed new selected data rate to said preferred selected data transmission rate and determining the difference therebetween; and transmitting a failure to train signal to said source facsimile apparatus in response, to said difference being greater than a selected value and transmitting a confirmation signal to said source facsimile apparatus in response to said difference being less than a selected value.

3. A method of communicating facsimile data from a source facsimile apparatus including a modem having a variable transmission rate and connected by a radio network to a destination facsimile apparatus as set forth in claim 5 in which said step of transmitting a retrain signal from said interworking function modem to said source facsimile apparatus includes the steps of:

transmitting a retrain signal comprising a retrain positive signal; and C) transmitting said confirmation signal in response to said new selected data transmission rate being less than or equal to said preferred selected data transmission rate.

4. A method of communicating facsimile data from a source facsimile apparatus including a modem having a variable transmission rate and connected by a radio network to a destination facsimile apparatus as set forth in claim 2 in which said step of transmitting a retrain signal from said interworking function modem to said source facsimile apparatus includes the steps of:

transmitting a retrain signal comprising a retrain negative signal; and transmitting said confirmation signal in response to said new selected data transmission rate being less than or equal to said preferred selected data transmission rate.

5. A system for communicating facsimile data from a source facsimile apparatus including a modem having a variable transmission rate and connected by a radio network to a destination facsimile apparatus and located in a mobile subscriber station which is coupled to a base station within said radio network by a radio link, said system comprising:

- means for receiving facsimile data transmitted at a selected data transmission rate from said source facsimile apparatus at an interworking function located in said radio network, said interworking function including a modem for receiving said facsimile data, and a buffer memory for storing said facsimile data;
- means for storing said facsimile data within said buffer memory;
- means for transmitting said facsimile data from said buffer memory via said radio link to said destination facsimile apparatus within said mobile station;
- means for monitoring the quantity of said facsimile data stored in said buffer memory while said facsimile data is received by said interworking function modem and transmitted from said buffer memory via said radio link;
- means for changing said selected data transmission rate at said source facsimile apparatus in response to a difference between said selected data transmission rate and an actual transmission rate which radio transmission conditions on said radio link permit as data is transmitted via said radio link to said destination facsimile apparatus within said mobile station;
- means within said interworking function for determining a preferred selected data transmission rate from said source facsimile apparatus, said preferred selected data transmission rate being approximately equal to the actual transmission rate which radio transmission conditions on said radio link permit data to be transmitted to said mobile station via said radio link, said determining means further comprising:
- means for sending a first signal from said source facsimile apparatus to said interworking function after each page of facsimile data is sent from said source facsimile apparatus, and sending a second signal from said source facsimile apparatus to said interworking function when there exists a subsequent page of facsimile data to be sent from said source facsimile apparatus;
- means for sending a third signal from said interworking function to said source facsimile apparatus in response to said second signal when said buffer is empty of said facsimile data representing the page previously transmitted;
- means for repetitively initiating a timer in said source facsimile apparatus, for measuring a period of time within which said source facsimile apparatus must receive said third signal before transmitting said subsequent page of facsimile data; and
- means for determining said preferred selected data transmission rate for said source facsimile apparatus in response to a total number of second signals received by said interworking function modem prior to the production of said third signal thereby.

6. A system for communicating facsimile data from source facsimile apparatus including a modem having a variable transmission rate and connected by a radio network to a destination facsimile apparatus as set forth in claim 11 in which said means for determining said preferred selected data transmission rate includes:

- means for transmitting a retrain signal from said interworking function modem to said source facsimile apparatus;
- means for receiving a signal proposing a new selected data transmission rate from said source facsimile apparatus in response to said retrain signal;
- means for comparing the proposed new selected data transmission rate to said preferred selected data transmission rate and determining the difference therebetween; and
- means for transmitting a failure to train signal to said source facsimile apparatus in response to said difference being greater than a selected value and transmitting a confirmation signal to said source facsimile apparatus in response to said difference being less than a selected value.

7. A system for communicating facsimile data from a source facsimile apparatus including a modem having a variable transmission rate and connected by a radio network to a destination facsimile apparatus as set forth in claim 6 in which said retrain signal comprises a retrain positive signal and said confirmation signal is transmitted in response to said new selected data transmission rate being less than or equal to said preferred selected data transmission rate.

8. A system for communicating facsimile data from a source facsimile apparatus including a modem having a variable transmission rate and connected by a radio network to a destination facsimile apparatus as set forth in claim 6 in which said retrain signal comprises a retrain negative signal and said confirmation signal is transmitted in response to said new selected data transmission rate being less than or equal to said preferred selected data transmission rate.

9. An interworking function within a radio network for receiving facsimile data from a source facsimile apparatus including a modem having a variable transmission rate and forwarding said facsimile data via a radio interface to a destination facsimile apparatus in a mobile station located within said radio network, said interworking function comprising:

- a modem for receiving facsimile data at a first data rate and including means for exchanging control signals with the modem of said source facsimile apparatus;
- a buffer memory for storing data received by said modem from said source facsimile apparatus;
- means for sending facsimile data stored in said buffer memory to said destination facsimile apparatus in said mobile station via said radio interface at a second data rate determined by existing radio transmission conditions between said mobile station and the radio base station with which said mobile station is connected;
- means for determining a difference between said first and second data rates, said difference determining means including means for monitoring a total number of times a multipage signal is received from said source facsimile apparatus prior to an emptying of said buffer memory of a received page of facsimile data; and
- means responsive to said difference determining means for exchanging control signals between said modem within said interworking function and said modem within said source facsimile apparatus to change said first data rate and thereby decrease the difference between it and said second data rate, said control signal exchanging means including:
- means for sending a retrain signal to said source facsimile apparatus;
- means for sending a signal from said source facsimile apparatus proposing a different first data rate; and
- means for comparing said different first data rate to said second data rate and sending to said source facsimile apparatus either a confirmation signal if the difference therebetween is less than a preselected value or a failure to train signal if the difference is greater than a preselected value.

* * * * *

UNITED STATES PATENT AND TRADEMARK OFFICE
CERTIFICATE OF CORRECTION

PATENT NO. : 5,491,565
DATED : February 13, 1996
INVENTOR(S) : Hans P. Naper

It is certified that error appears in the above-identified patent and that said Letters Patent are hereby corrected as shown below:

Column 12, line 44, change "Claim 5" to --Claim 2--;
Column 12, line 50, delete "C)"; and
Column 13, line 59, change "Claim 11" to --Claim 5--.

Signed and Sealed this

Eighth Day of April, 1997

BRUCE LEHMAN

Attest:

Attesting Officer

Commissioner of Patents and Trademarks